US012275014B2

(12) United States Patent
Sorensen

(10) Patent No.: US 12,275,014 B2
(45) Date of Patent: Apr. 15, 2025

(54) TUBE RETAINER WITH VACUUM PUMP HAVING DISK CAM

(71) Applicant: Siemens Healthcare Diagnostics Inc., Tarrytown, NY (US)

(72) Inventor: George Sorensen, Mount Bethel, PA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 18/696,338

(22) PCT Filed: Sep. 28, 2022

(86) PCT No.: PCT/US2022/077155
§ 371 (c)(1),
(2) Date: Mar. 27, 2024

(87) PCT Pub. No.: WO2023/056281
PCT Pub. Date: Apr. 6, 2023

(65) Prior Publication Data

US 2024/0335839 A1 Oct. 10, 2024

Related U.S. Application Data

(60) Provisional application No. 63/249,102, filed on Sep. 28, 2021.

(51) Int. Cl.
*B01L 9/06* (2006.01)

(52) U.S. Cl.
CPC ........... *B01L 9/06* (2013.01); *B01L 2200/025* (2013.01); *B01L 2300/0848* (2013.01); *B01L 2300/123* (2013.01); *B01L 2300/14* (2013.01)

(58) Field of Classification Search
None
See application file for complete search history.

(56) References Cited

U.S. PATENT DOCUMENTS 5,407,640 A * 4/1995 Iles .......................... B01L 9/50 211/74
2005/0180896 A1 8/2005 Itoh
(Continued)

FOREIGN PATENT DOCUMENTS

EP 4 169 500 A1 4/2023
WO 2019/067195 A1 4/2019

OTHER PUBLICATIONS

PCT International Search Report and Written Opinion dated Dec. 14, 2022 (12 Pages).
(Continued)

*Primary Examiner* — Elizabeth A Robinson
*Assistant Examiner* — Brittany I Fisher

(57) ABSTRACT

Embodiments provide a tube retainer system, including: an outer body; a diaphragm having a circular opening; a valve including a valve head and a valve stem attached to the valve head; a cam; a camshaft extending through the cam; a drive gear attached to the camshaft; a restraint gear attached to the camshaft; a push bar located below the diaphragm; and a pawl. The diaphragm, the cam, the drive gear, the restraint gear, the push bar, and the pawl are all provided in the outer body, when a bottom of a tube is inserted into the circular opening and a downward pressure is applied on the diaphragm, the cam is oriented to close the valve to form a partial vacuum in the outer body to secure the bottom of the tube within the circular opening.

18 Claims, 9 Drawing Sheets

(56) References Cited

U.S. PATENT DOCUMENTS

| | | | |
|---|---|---|---|
| 2014/0301916 | A1 | 10/2014 | Ohga et al. |
| 2017/0153262 | A1 | 6/2017 | Lair |
| 2018/0072505 | A1 | 3/2018 | Lyman et al. |
| 2020/0276589 | A1 | 9/2020 | Sorensen |

OTHER PUBLICATIONS

Extended EP Search Report dated Dec. 16, 2024 of corresponding European Application No. 22877520.1, 4 Pages.

* cited by examiner

TUBE RETAINER WITH VACUUM PUMP HAVING DISK CAM

CROSS REFERENCE TO RELATED APPLICATION

This application claims the benefit of U.S. Provisional Patent Application No. 63/249,102, entitled "TUBE RETAINER WITH VACUUM PUMP HAVING DISK CAM" filed Sep. 28, 2021, the disclosure of which is hereby incorporated by reference in its entirety for all purposes.

TECHNOLOGY FIELD

The present invention relates generally to a tube retainer, and more particularly to a system and method of retaining a test tube in a holder through the use of a vacuum pump integrated into the holder.

BACKGROUND

PCT application no. WO2019067195A1 discloses a Test Tube Vacuum Retainer (TTVR), which relies upon an external or internal vacuum pump to provide a partial vacuum. An external vacuum source requires a special interface to the TTVR. An internal vacuum pump may be powered by electricity from a battery or external power connection. Both approaches add high cost and complexity to the design and operation of the TTVR and a tube handling system encompassing the TTVR.

SUMMARY

Embodiments provide a tube retainer system, including: an outer body; a diaphragm having a circular opening; a valve including a valve head and a valve stem attached to the valve head; a cam, wherein the valve stem is engaged with the cam; a camshaft extending through the cam; a drive gear attached to the camshaft; a restraint gear attached to the camshaft; a push bar located below the diaphragm, wherein one end of the push bar is connected to the outer body, and the other end of the push bar is in contact with one of teeth of the drive gear, pushing the drive gear to move in a first direction; and a pawl, wherein one end of the pawl is connected to the outer body, and the other end of the pawl is in contact with one of the teeth of the restraint gear, preventing the restraint gear from moving in a second direction opposite to the first direction. The diaphragm, the cam, the drive gear, the restraint gear, the push bar, and the pawl are all provided in the outer body, when a bottom of a tube is inserted into the circular opening and a downward pressure is applied on the diaphragm, the cam is oriented to close the valve to form a partial vacuum in the outer body to secure the bottom of the tube within the circular opening.

Embodiments provide a tube retainer system, wherein the cam is an N-lobe cam, wherein N is equal to or larger than 1, and the N-lobe cam performs 1/N rotations to complete a tube pump cycle.

Embodiments provide a tube retainer system, wherein the cam is a 2-lobe cam and includes two lobes.

Embodiments provide a tube retainer system, wherein a difference between a maximum radius of the cam and a minimum radius of the cam is a distance within which the valve head is movable.

Embodiments provide a tube retainer system, further comprising a valve cap attached to the outer body, wherein the valve cap is provided over a valve head of the valve to protect the valve head from splashed or spilled tube content.

Embodiments provide a tube retainer system, a first hole or slot is provided in a left sidewall of the valve cap, and a second hole or slot is provided in a right sidewall of the valve cap.

Embodiments provide a tube retainer system, wherein the valve is a captive valve further including a valve base, and the valve base is engaged with a groove inside the cam.

Embodiments provide a tube retainer system, wherein the valve is a normally closed valve including a spring and an extension horizontally extending from the valve stem of the valve, wherein the extension is located below the spring, and the spring presses against the extension to keep the valve closed.

Embodiments provide a tube retainer system, wherein the valve is a normally open valve including a bracket, a spring, and an extension horizontally extending from the valve stem of the valve, wherein the spring and the extension are located within the bracket, wherein the extension is located above the spring, and the spring presses against the extension to keep the valve open.

Embodiments provide a tube retainer system, wherein the valve is a captive valve further including a valve base, and the valve base is engaged with a groove in an external surface of the cam.

Embodiments provide a tube retainer system, wherein the valve is a captive valve, and one end of the valve stem is engaged with a surface of the cam through magnetism.

Embodiments provide a tube retainer system, wherein the valve is a pinch valve including a flexible tube passing through a sidewall of the outer body, the pinch valve is closed when the valve stem of the valve applies sufficient pressure against the flexible tube to compress the flexible tube and prevent a passage of air through the flexible tube, and the pinch valve is open when the pressure on the valve stem is removed, so that the flexible tube resumes its original shape.

Embodiments provide a tube retainer system, wherein the valve is a gate valve, the gate valve is closed when a hole in the outer body is covered by the valve head of the gate valve, and the gate valve is open when the hole is exposed, wherein a motion of the gate valve is parallel to the hole.

Embodiments provide a tube retainer system, wherein the valve is a swing check valve, the swing check valve is closed when a hole in the outer body is covered by the valve head of the swing check valve, and the swing check valve is open when the hole is exposed, wherein a motion of the swing check valve is perpendicular to the hole.

Embodiments provide a tube retainer system, wherein the first direction is a counterclockwise direction, and the second direction is a clockwise direction. The tube retainer system as recited in claim 1, wherein the push bar includes a protrusion located below the circular opening, so that the bottom of the tube contacts the protrusion when the bottom of the tube is inserted into the circular opening.

Embodiments further provide a tube retainer system, including: an outer body; a diaphragm having a circular opening; a valve including a valve head and a valve stem attached to the valve head; a cam, wherein the valve stem is connected to the cam; a camshaft extending through the cam; a drive gear attached to the camshaft; a restraint gear attached to the camshaft; a push bar located below the diaphragm, wherein one end of the push bar is connected to the outer body, and the other end of the push bar is in contact with one of teeth of the drive gear, pushing the drive gear to move in a first direction; and a pawl, wherein one end of the pawl is connected to the outer body, and the other end of the pawl is in contact with one of teeth of the restraint gear, preventing the restraint gear from moving in a second direction opposite to the first direction. The diaphragm, the valve stem, the cam, the drive gear, the restraint gear, the push bar, and the pawl are all provided in the outer body, and the valve head is provided outside of the outer body. When a bottom of a tube is inserted into the circular opening and a first downward pressure is applied on the diaphragm, the cam is oriented to close the valve to form a partial vacuum in the outer body to secure the bottom of the tube within the circular opening; when the tube is picked up from the circular opening, a second downward pressure is applied on the diaphragm immediately prior to picking up the tube, and the cam is oriented to open the valve to restore atmospheric pressure in the outer body, so that the bottom of the tube is removable from the circular opening.

Embodiments further provide a tube retainer system, including: an outer body; a diaphragm having a circular opening; a valve including a valve head and a valve stem attached to the valve head; a cam, wherein the valve stem is connected to the cam; a camshaft extending through the cam; a drive gear attached to the camshaft; a restraint gear attached to the camshaft; a push bar located below the diaphragm, wherein one end of the push bar is connected to the outer body, and the other end of the push bar is in contact with one of the teeth of the drive gear, pushing the drive gear to move in a first direction; and a pawl, wherein one end of the pawl is connected to the outer body, and the other end of the pawl is in contact with one of teeth of the restraint gear, preventing the restraint gear from moving in a second direction opposite to the first direction. The diaphragm, the valve stem, the cam, the drive gear, the restraint gear, the push bar, and the pawl are all provided in the outer body, and the valve head is provided outside of the outer body; a bottom of a tube is secured in the circular opening by means of a partial vacuum in the outer body. A downward pressure is applied on the diaphragm immediately prior to picking up the tube, and the cam is oriented to open the valve to restore atmospheric pressure in the outer body, so that the bottom of the tube is removable from the circular opening.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred; it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at systems and methods for integrating a vacuum pump into a test tube vacuum retainer (TTVR) system. This disclosure uses the linear motion of test tube placement to power an internal vacuum pump through a 4-step pump cycle. A partial vacuum (the air pressure within the TTVR system is less than the ambient air pressure) is created when placing a tube into the holder of the TTVR system, so that the test tube can be more securely held; whereas the partial vacuum is released when removing the test tube from the holder.

In an embodiment, the placement of a tube drives a camshaft, which in turn controls a valve to admit or release air. Initially, the valve is open. As the tube is pressed down against a diaphragm of the TTVR vacuum compartment, the volume of the compartment is reduced, and some of the air inside the compartment is released from the compartment. The valve is closed as the downward pressure on the tube is decreased. When the downward pressure on the tube is removed, the diaphragm, against which the tube was pressed down, returns to its "at rest" position (i.e., the original position). Thus, the volume of the TTVR vacuum compartment is increased, while the air in the TTVR vacuum compartment is reduced, resulting in a partial vacuum. Immediately prior to picking up the tube (i.e., removing it from the TTVR system), the tube is again subjected to a downward pressure (if a tube is lifted, downward pressure is initially applied when touching the tube, followed by an upward force to lift the tube up). The downward pressure opens the valve and thus restores ambient air pressure (i.e., standard atmospheric pressure) inside the TTVR vacuum compartment. When the downward pressure on the tube is decreased, the valve remains open, because the pressure above the valve (standard atmospheric pressure) is the same as the pressure below the valve (i.e., the pressure of the compartment is equal to the standard atmospheric pressure). Thus, there is no partial vacuum inside the TTVR vacuum compartment at this point, and the tube can be removed from the diaphragm without the resistance of a partial vacuum.

Advantages of embodiments of the present disclosure include the elimination of a separate internal or external vacuum pump, which reduces overall cost and complexity. Additionally, the integrated pump is driven and controlled by a tube placement process, which simplifies workflow. Additionally, the cam shape and orientation can be adjusted to optimize vacuum pump performance.

Figure 6C:
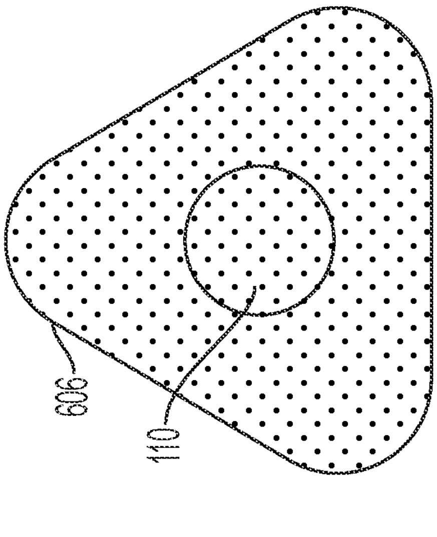
FIGS. 6A-6C depict alternative cam embodiments.
Figure 6B:
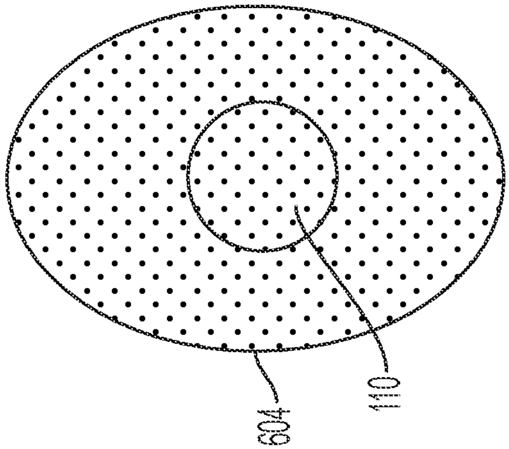
Figure 6A:
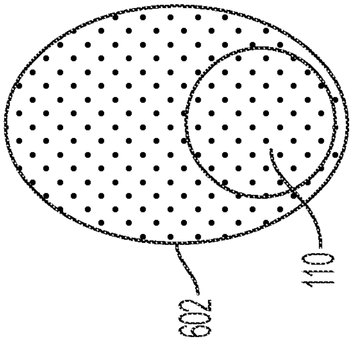

Alternative embodiments can include varying cam shapes, varying follower (the valve stem following the cam) constraints (constrained by gravity, constrained by spring, constrained by mechanical engagement), and the number of lobes. A disk cam with a single lobe (e.g., as shown in FIG. 6A) will require one full rotation to complete a pump cycle. In general, 1/N cam rotations will be needed to complete a pump cycle, where N is the number of lobes. Additional alternative embodiments can include different valve default states, e.g., a captive mechanism in which the valve position is mechanically constrained by the cam position, a normally closed valve, or a normally open valve. Additional alternative embodiments can include the addition of a cap over the valve to protect the valve from splashed or spilled tube content that could impair the vacuum seal. Additional alternative embodiments of a valve can include a globe valve, a gate valve, a swing check valve, or a pinch valve, etc.

Figure 1:
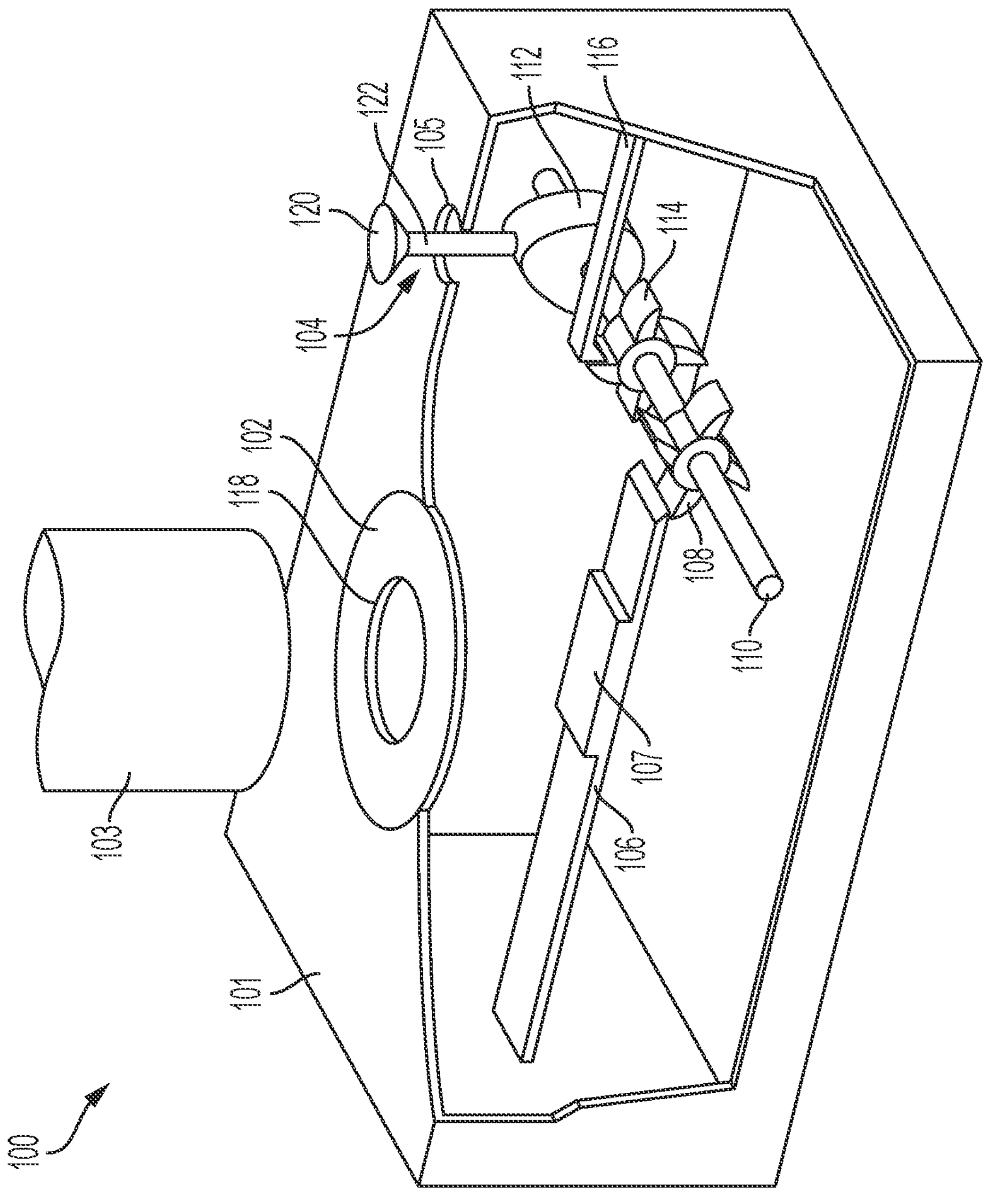
FIG. 1 illustrates a perspective view of a TTVR system having an integrated vacuum pump, in accordance with embodiments described herein.

FIG. 1 illustrates a perspective view of an exemplary TTVR system having an integrated vacuum pump. In an embodiment, the TTVR system 100 can include an outer body 101, which can be a rectangular prism or in other shapes, diaphragm 102, valve 104, valve seat 105, push bar 106, drive gear 108, camshaft 110, cam 112, restraint gear 114, and pawl 116 (the restraint gear 114 and the pawl 116 form a ratchet). The diaphragm 102, valve 104, push bar 106, drive gear 108, camshaft 110, cam 112, restraint gear 114, and pawl 116 are all placed in the outer body 101. The valve 104 includes valve head 120 and valve stem 122. The valve stem 122 is constrained to follow the surface of the cam 112. The diaphragm 102 can include a circular opening 118 into which a test tube 103 can fit.

The push bar 106 may be connected to the outer body 101. In an embodiment, the thickness of the push bar 106 may be adjusted for better contact with the test tube 103. For example, the push bar 106 includes a protrusion 107 below the circular opening 118. In an alternate embodiment, a spacer can be attached to the push bar 106, and the spacer is below the circular opening 118.

The motion of the test tube 103 is transmitted by the push bar 106 to the drive gear 108, which is attached to the camshaft 110. The camshaft 110 connects the drive gear 108, the restraint gear 114, and the cam 112 together. In an embodiment, the restraint gear 114 is placed between the drive gear 108 and the cam 112. In another embodiment, the restraint gear 114 and the drive gear 108 are on the same side of the cam 112. In an alternate embodiment, the restraint gear 114 and the drive gear 108 can be integrated as one gear. The linear motion of the diaphragm 102 is transformed through the drive gear 108 into the rotational motion of the camshaft 110. The restraint gear 114, in combination with the pawl 116, prevents the camshaft 110 from rotating in a reverse direction when the push bar 106 returns to its at-rest position.

FIGS. 2-5 schematically illustrate a view of the exemplary TTVR system at steps 1-4 of a pump cycle. To illustrate the drive gear 108, the cam 112, and the restraint gear 114 more clearly, the three elements are shown separately with a gap between each other. The three elements are all attached to the camshaft 110.

Figure 2:
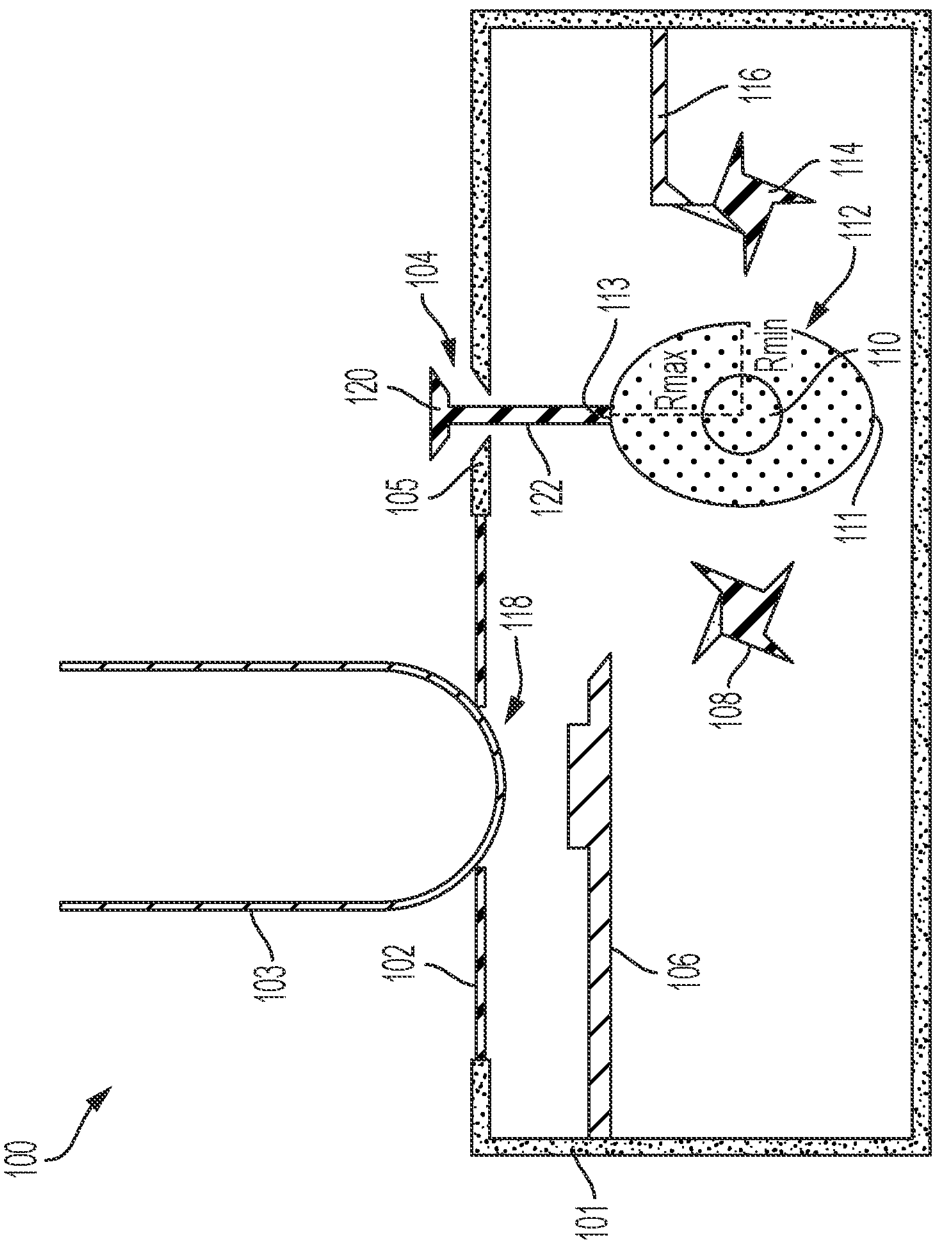
FIG. 2 schematically illustrates a view of the TTVR system at step 1 (beginning) of the pump cycle.

FIG. 2 schematically illustrates a view of the exemplary TTVR system at step 1 of a pump cycle. At this point, the test tube 103 is resting on the circular opening 118 of the diaphragm 102 (its rest position). As shown in FIG. 2, the diaphragm 102 and the push bar 106 are at their rest positions. The diaphragm 102 is attached to the top of the outer body 101. One end of the push bar 106 is attached to the outer body 101, and the other end of the push bar 106 is positioned below the test tube 103. The cam 112, for this example, has two lobes 111, 113. The difference between the maximum radius $R_{max}$ of each lobe 111, 113 and the minimum radius $R_{min}$ of the cam 112 determines the distance that the valve head 120 can move, and the number of lobes determines the number of teeth on the drive gear 108 and the restraint gear 114 (for example, one lobe requires a gear with two teeth, two lobes require a gear with four teeth, three lobes require a gear with six teeth, etc.). At this point, the cam 112 is oriented such that the valve 104 is in an open position (the valve head 120 is separate from the valve seat 105 in the outer body 101), and thus the outer body 101 is under ambient atmospheric pressure. One end of the pawl 116 is attached to the sidewall (e.g., right side) of the outer body 101, and the other end of the pawl 116 is in contact with the restraint gear 114, preventing the restraint gear 114 from moving, e.g., in a clockwise direction. The camshaft 110 constrains the drive gear 108, the cam 112, and the restraint gear 114 rotate together, because the drive gear 108, the cam 112, and the restraint gear 114 are all attached to the camshaft 110. Therefore, the drive gear 108, the restraint gear 114, and the cam 112 are all prevented from moving, e.g., in a clockwise direction. Accordingly, the valve 104 is prevented from being closed and remains open.

In an alternative embodiment, the number of teeth on the drive gear 108 and the restraint gear 114 can be different. For example, the drive gear 108 and the restraint gear 114 can be placed on a first shaft and a second shaft, respectively. The drive gear 108 and the restraint gear 114 are connected to the camshaft 110 through another gear or a pulley, respectively.

Figure 3:
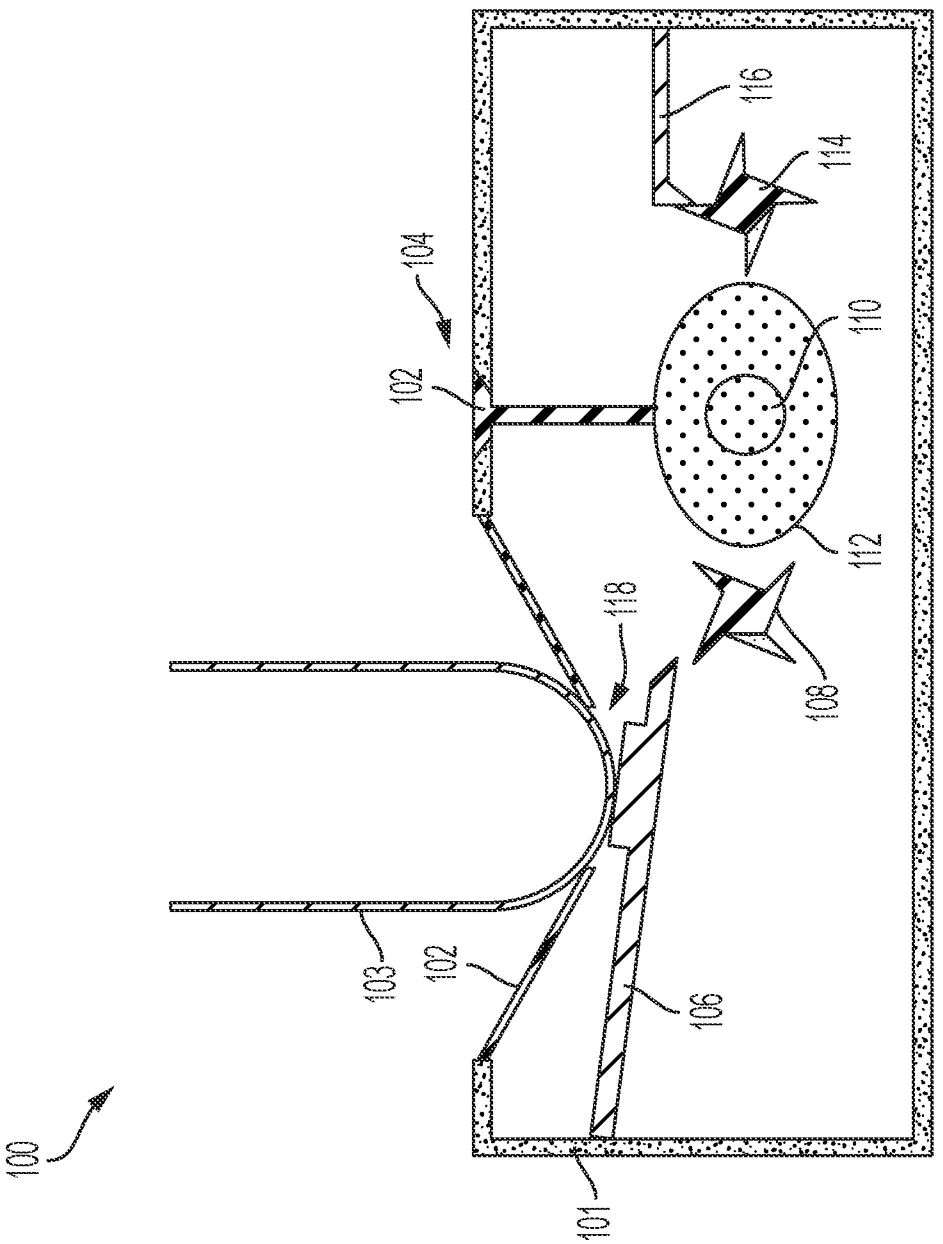
FIG. 3 schematically illustrates a view of the TTVR system at step 2 of the pump cycle.

FIG. 3 schematically illustrates a view of the exemplary TTVR system at step 2 of a pump cycle. At this point, the test tube 103 is inserted into the circular opening 118 of the diaphragm 102, and the test tube 103 has pressed the diaphragm 102 to its maximum extended position. The volume of the outer body 101 is reduced, and some of the air has been released from the outer body 101, and the valve head 120 is closed. As shown in FIG. 3, the bottom of the test tube 103 is fit into the circular opening 118 of the diaphragm 102. At this point, the push bar 106 is at its lowest (engaged) position, having rotated the drive gear 108 counter-clockwise by 90 degrees. The cam 112 is oriented such that the valve 104 is in a closed position. The pawl 116 is preventing the restraint gear 114 from moving in a clockwise direction. The camshaft 110 (not shown in FIG. 3) constrains the drive gear 108, the cam 112, and the restraint gear 114 to rotate together, because the drive gear 108, the cam 112, and the restraint gear 114 are all attached to the camshaft 110. Therefore, the drive gear 108, the restraint gear 114, and the cam 112 are all prevented from moving. Accordingly, the valve 104 is prevented from being opened and remains closed.

Figure 4:
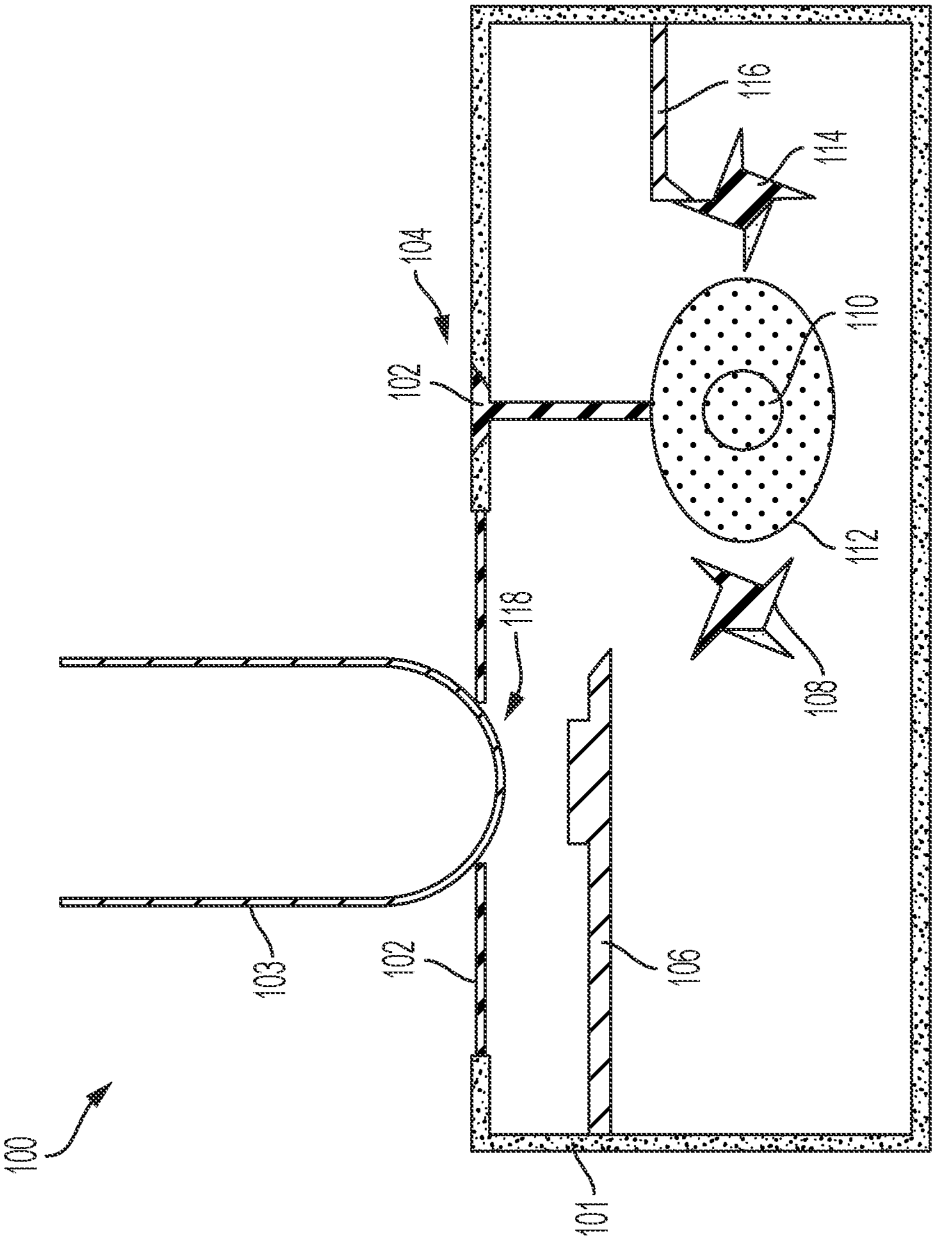
FIG. 4 schematically illustrates a view of the TTVR system at step 3 of the pump cycle.

FIG. 4 schematically illustrates a view of the exemplary TTVR system at step 3 of a pump cycle. At this point, the test tube 103 rests on the diaphragm 102. As shown in FIG. 4, with the bottom of the test tube 103 fit into the circular opening 118 of the diaphragm 102, the diaphragm 102 works as a tube holder to secure the test tube 103 by means of the partial vacuum. The downward pressure on the test tube 103 is removed after the test tube 103 rests on the tube holder, so that the diaphragm 102 can return to its rest position. This expands the volume inside the outer body 101, which results in a partial vacuum inside the outer body 101. The push bar 106 has returned to its highest (rest) position. The cam 112 is still oriented such that the valve 104 is in a closed position because there is no force acting on drive gear 108 to move it in a counter-clockwise direction and the pawl 116 is preventing restraint gear 114 from moving in a clockwise direction. The camshaft 110 constrains the drive gear 108, the cam 112, and the restraint gear 114 to rotate together, because the drive gear 108, the cam 112, and the restraint gear 114 are all attached to the camshaft 110. Therefore, the drive gear 108, the restraint gear 114, and the cam 112 are all prevented from moving, e.g., in a clockwise direction. Accordingly, the valve 104 is prevented from being opened and remains closed.

Figure 5:
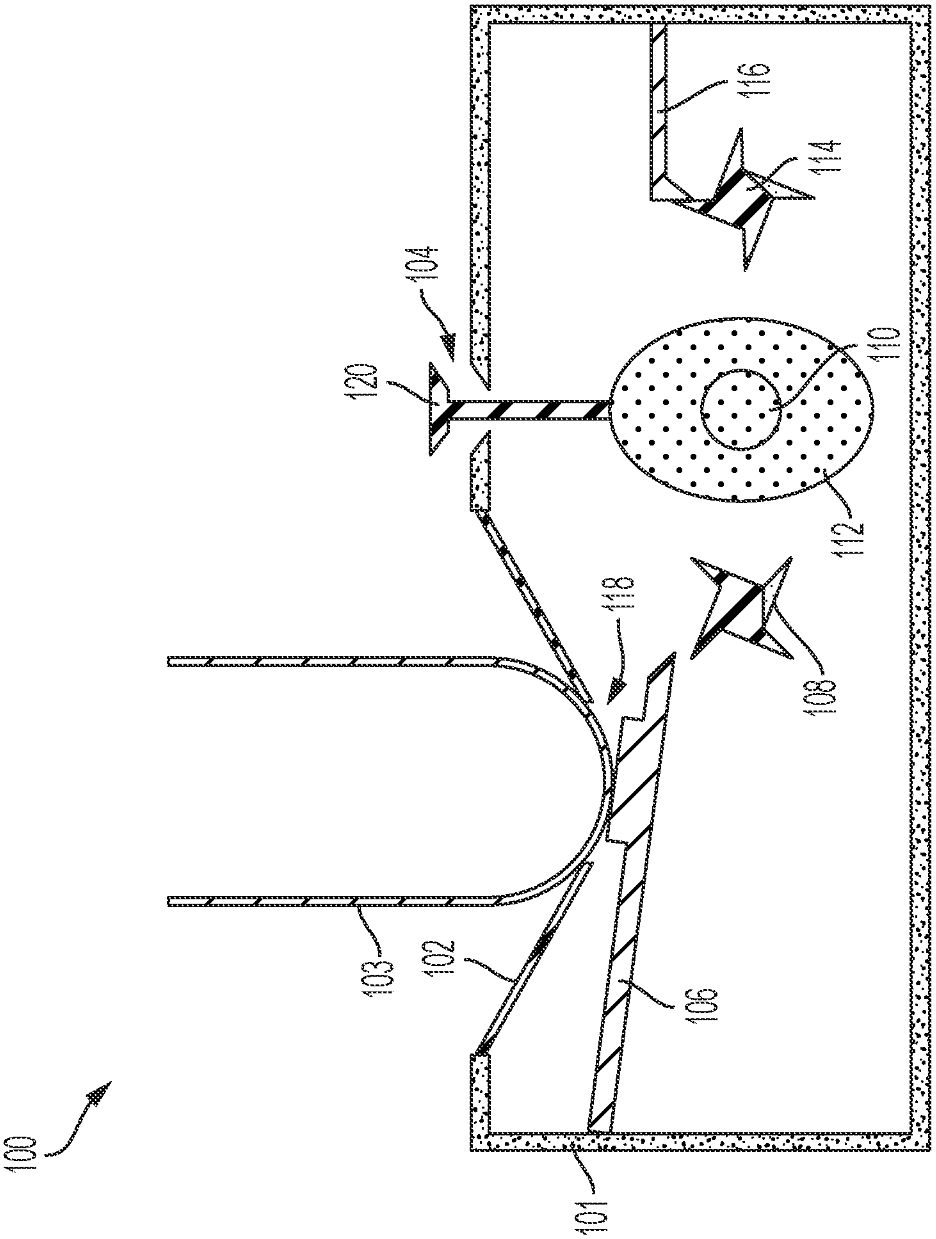
FIG. 5 schematically illustrates a view of the TTVR system at step 4 of the pump cycle.

FIG. 5 schematically illustrates a view of the exemplary TTVR system at step 4 of a pump cycle. Immediately prior to picking up the tube (removing it from the TTVR system), the tube is again subjected to downward pressure. At this point, the test tube 103 has pressed the diaphragm 102 to its maximum extended position due to the downward pressure. As shown in FIG. 5, the push bar 106 is at its lowest (engaged) position, having rotated drive gear 108 counter-clockwise by an additional 90 degrees. The cam 112 is oriented such that the valve 104 is in an open position, and thus the outer body 101 is restored to ambient atmospheric pressure. The pawl 116 is preventing the restraint gear 114 from moving in a clockwise direction. The camshaft 110 constrains the drive gear 108, the cam 110, and the restraint gear 114 to rotate together, because the drive gear 108, the cam 112, and the restraint gear 114 are all attached to the camshaft 110. Therefore, the drive gear 108, the restraint gear 114, and the cam 112 are all prevented from moving, e.g., in a clockwise direction. Accordingly, the valve 104 is prevented from being closed and remains open.

FIG. 6A illustrates a cross section view of a 1-lobe exemplary cam 602. In this embodiment, the 1-lobe cam 602 requires one complete rotation (360 degrees) to complete the 4-step pump cycle. The detailed shape may be changed to optimize performance. FIG. 6B illustrates a cross section view of a 2-lobe exemplary cam 604. In this embodiment, the 2-lobe cam requires one half complete rotation (180 degrees) to complete the 4-step pump cycle. FIG. 6C illustrates a cross section view of a 3-lobe exemplary cam 606. In this embodiment, the 3-lobe cam requires one third rotation (120 degrees) to complete the 4-step pump cycle. In another embodiment, N-lobe cam, e.g., 4-lobe cam, 5-lobe cam, 6-lobe cam, . . . , N-lobe cam, etc., may be employed as needed.

Figures 7A, 7B, 7C:
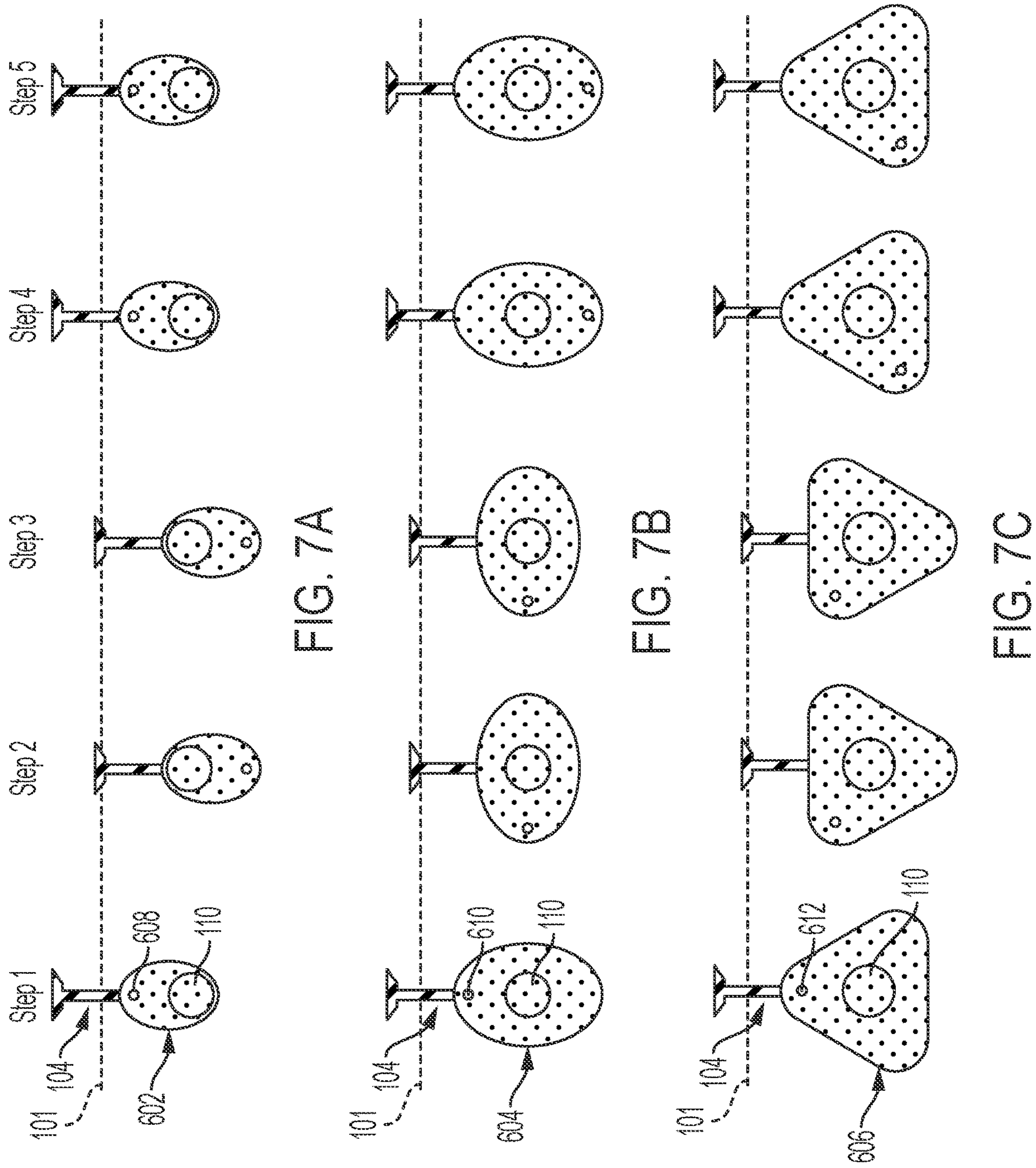
FIGS. 7A-7C depict complete 4-step pump cycles for alternative cam embodiments.

FIG. 7A illustrates the rotation of a 1-lobe cam 602 through a complete 4-step pump cycle. FIG. 7B illustrates the rotation of a 2-lobe cam 604 through a complete 4-step pump cycle. FIG. 7C illustrates the rotation of a 3-lobe cam 606 through a complete 4-step pump cycle. In each case, a dot (608, 610, 612) on each starting lobe indicates the motion of that lobe.

FIG. 7A depicts the motion of a 1-lobe cam 602 through the 4-step pump cycle. In step 1, the tube 103 (not shown in FIG. 7A) is at its “at rest” position, and the tube 103 has just been placed onto the diaphragm 102 (not shown in FIG. 7A). Air pressure within the outer body 101 is equal to the ambient air pressure, due to the open valve 104. In step 2, the downward motion of the tube 103 has rotated cam 602 to where the valve 104 is closed. At this point, the air pressure within the outer body 101 is still equal to the ambient air pressure. In step 3, the tube 103 has been retracted to its “at rest” position. The cam 602 remains motionless in both step 2 and step 3. At this point, the air pressure within the outer body 101 is less than ambient air pressure due to the closed valve 104 and an increased volume within the outer body 101. In step 4, the downward motion of the tube 103 has rotated cam 602 such that the valve 104 is open. At this point, the air pressure within the outer body 101 is equal to the ambient air pressure, due to the open valve 104.

FIG. 7B depicts the motion of a 2-lobe cam 604 through the 4-step pump cycle. In step 1, the tube 103 (not shown in FIG. 7B) is at its “at rest” position, and the tube 103 has just been placed onto the diaphragm 102 (not shown in FIG. 7B). The air pressure within outer body 101 is equal to the ambient air pressure, due to the open valve 104. In step 2, the downward motion of the tube 103 has rotated cam 604 to where valve 104 is closed. At this point, the air pressure within the outer body 101 is still equal to the ambient air pressure. In step 3, the tube 103 has been retracted to its “at rest” position. The cam 604 remains motionless in both step 2 and step 3. At this point, the air pressure within outer body 101 is less than the ambient air pressure, due to closed valve 104 and an increased volume within outer body 101. In step 4, the downward motion of the tube 103 has rotated the cam 604 such that the valve 104 is open. At this point, the air pressure within outer body 101 is equal to the ambient air pressure, due to the open valve 104.

FIG. 7C depicts the motion of a 3-lobe cam 606 through the 4-step pump cycle. In step 1, the tube 103 (not shown in FIG. 7C) is at its “at rest” position, and the tube 103 has just been placed onto the diaphragm 102 (not shown in FIG. 7C). The air pressure within the outer body 101 is equal to the ambient air pressure, due to the open valve 104. In step 2, the downward motion of the tube 103 has rotated the cam 606 to where the valve 104 is closed. The air pressure within the outer body 101 is still equal to the ambient air pressure. In step 3, the tube 103 has been retracted to its “at rest” position. The cam 606 remains motionless in both step 2 and step 3. At this point, the air pressure within the outer body 101 is less than the ambient air pressure, due to the closed valve 104 and an increased volume within the outer body 101. In step 4, the downward motion of the tube has rotated cam 606 such that valve 104 is open. At this point, the air pressure within the outer body 101 is equal to the ambient air pressure, due to the open valve 104.

Figures 8A, 8B, 8C, 8D, 8E, 8F:
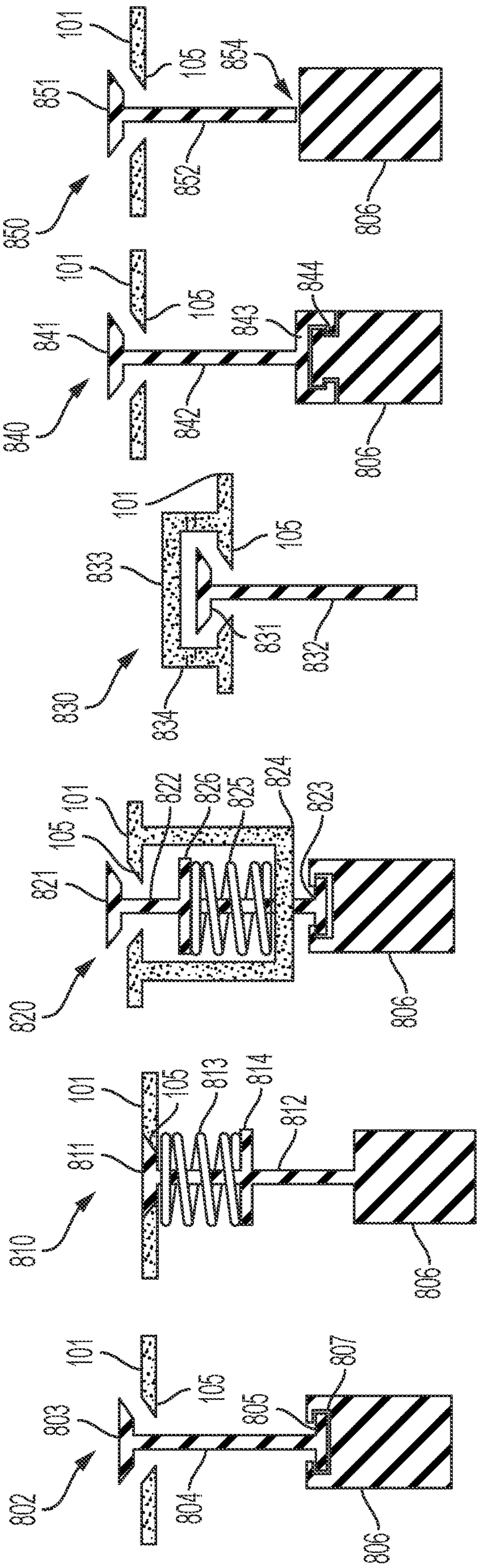
FIGS. 8A-8F depict alternative valve control embodiments.

FIG. 8A illustrates a cross section view of an exemplary captive valve 802 engaged with an internal groove 807 of the cam 806. The captive valve 802 includes valve head 803, valve stem 804, and valve base 805. The valve seat 105 is located on the outer body 101. The motion of the valve stem 804 in this embodiment is constrained to follow the motion of cam 806, because the valve base 805 is engaged with the groove 807 of the cam 806. The captive valve 802 requires tight tolerances in manufacturing. Alternate embodiments that incorporate elastic materials can relax the tolerances. For example, the valve head 803, valve stem 804, and valve base 805 can be made of an elastic material, e.g., nylon, polyvinylchloride (PVC), etc.

FIG. 8B illustrates a cross section view of an exemplary normally closed valve 810. The valve 810 includes valve head 811 and valve stem 812. The valve seat 105 is located on the outer body 101. In this embodiment, the valve 810 further includes a spring 813 and an extension 814 horizontally extending from the valve stem 812. The extension 814 is located below the spring 813, and the spring 813 presses against the extension 814 to keep the valve 810 closed. The valve head 811 is pushed open by the cam 806 during the 4-step pump cycle.

FIG. 8C illustrates a cross section view of an exemplary normally open valve 820. The valve 820 includes valve head 821, valve stem 822, and valve base 823. The valve base 823 is engaged with the groove 807 of the cam 806. The valve seat 105 is located on the outer body 101. In an embodiment, the valve 820 further includes a bracket 824 attached to the outer body 101, a spring 825, and an extension 826 horizontally extending from the valve stem 822. The bracket 824 provides a fixed surface to support the spring 825. The extension 826 is located above the spring 825, and the spring 825 presses against the extension 826 to keep the valve 820 open. The valve head 821 is pulled closed by cam 806 during the 4-step pump cycle.

In an alternative embodiment, the valve base 823 could wrap around the cam 806 to fit into one or two grooves in one side or two sides of the cam 806.

FIG. 8D illustrates a cross section view of an exemplary valve 830. The valve 830 includes valve head 831 and valve stem 832. The valve seat 105 is located on the outer body 101. The valve 830 further includes a valve cap 833, which is configured to protect the valve head 831 and valve seat 105 from any substance (e.g., tube content) that could build up on the valve head 831 and valve seat 105, resulting in a reduction of the effectiveness of the vacuum seal. In an embodiment, one or more holes or slots 834 are provided in the sidewall of the valve cap 833 to permit the free flow of air.

FIG. 8E illustrates a cross section view of an exemplary captive valve 840 engaged with a groove 844 in an external surface of the cam 806. The captive valve 840 includes valve head 841, valve stem 842, and valve base 843. The valve seat 105 is located on the outer body 101. The motion of the valve 840 in this embodiment is constrained to follow the motion of cam 806, because the valve base 843 is engaged with the groove 844 of the cam 806. A captive valve 840 requires tight tolerances in manufacturing. Alternate embodiments that incorporate elastic materials can relax the tolerances. For example, the valve head 841, the valve stem 842, and the valve base 843 can be made of an elastic material, e.g. nylon, polyvinylchloride (PVC), etc.

FIG. 8F illustrates a cross section view of an exemplary captive valve 850, which uses magnetism to be engaged with the surface of the cam 806. The captive valve 850 includes valve head 851 and valve stem 852. The valve seat 105 is located on the outer body 101. The valve stem 852 and cam 806 are made of materials that can be magnetized, or contain magnetic materials. In an embodiment, the end of the valve stem 852 close to the cam 806 is strongly magnetized. The magnetic force between the valve stem 852 and the cam 806 continually draws the valve stem 852 to the cam 806. The cam 806 can rotate to present different radii, and thus drive the motion of the valve 850. The motion of the valve 850 in this embodiment is constrained to follow the motion of the surface of cam 806. An advantage of magnetism over the mechanical constraint of a groove is a reduced mechanical tolerance, because a small gap 854 can be tolerated in this embodiment.

Figure 9A:
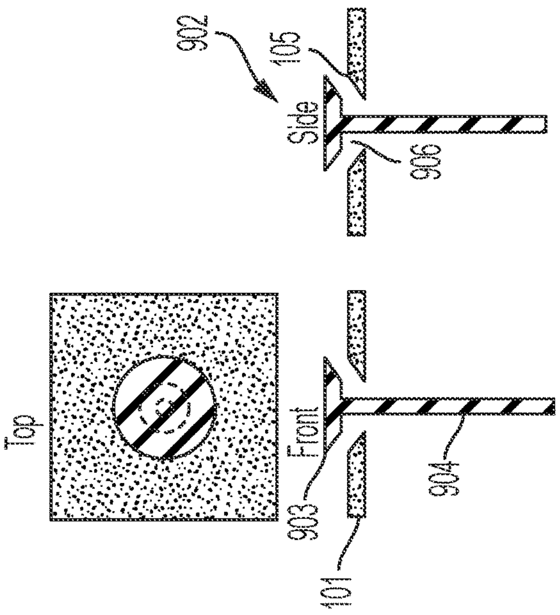
FIGS. 9A-9D depict alternative valve closure embodiments.

FIG. 9A provides top, front, and side views of an exemplary globe valve 902, which seals against outer body 101. In this embodiment, the motion of the globe valve 902 is perpendicular to the valve seat 105 in the outer body 101. The globe valve 902 includes valve head 903 and valve stem 904. The globe valve 902 is closed when the valve head 903 is seated against the valve seat 105 in the outer body 101 to seal the hole 906. The globe valve 902 is open when the valve head 903 is separated from the outer body 101 to expose the hole 906.

Figure 9B:
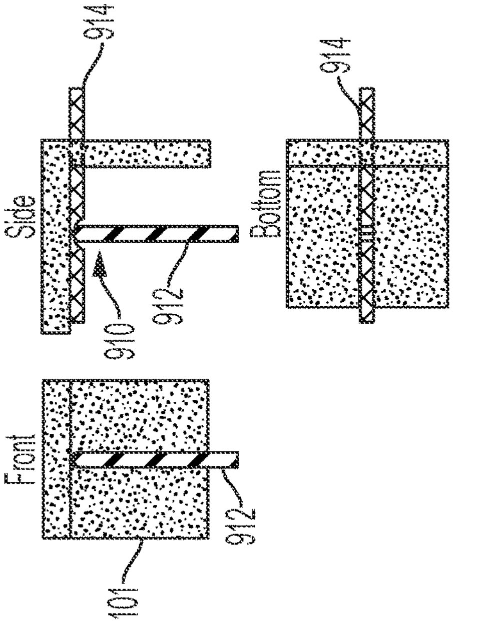

FIG. 9B provides front, side, and bottom views of an exemplary pinch valve 910. The pinch valve 910 includes a pinch valve stem 912. A flexible tube 914 passes through a sidewall of the outer body 101. The pinch valve 910 is closed when the pinch valve stem 912 applies sufficient pressure against the flexible tube 914 to compress it and prevent the passage of air through the flexible tube 914. The pinch valve 910 is open when the pressure on the pinch valve stem 912 is removed, so that the flexible tube 914 can resume its original shape.

Figure 9C:
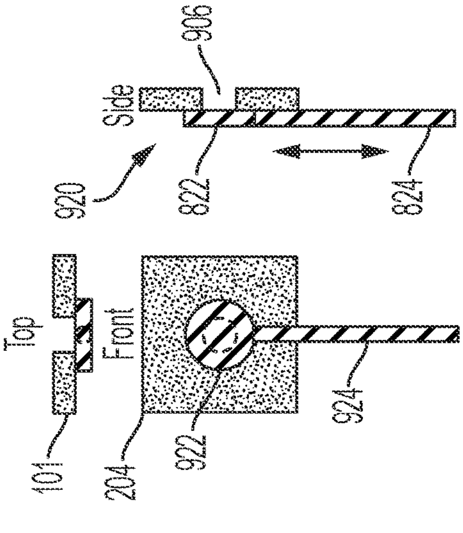

FIG. 9C provides top, front, and side views of an exemplary gate valve 920. The gate valve 920 includes a gate valve plate or gate valve head 922 and a valve stem 924 attached to the gate valve plate or gate valve head 922. With moving the valve stem 924, the gate valve plate or gate valve head 922 can be moved to cover the hole 906 in the outer body 101 or expose the hole 906. The motion of the gate valve plate or gate valve head 922 is parallel to the hole 906. The gate valve 920 is closed when the gate valve plate or gate valve head 922 covers the hole 906. The gate valve 920 is open when the hole 906 is not covered by the gate valve plate or gate valve head 922.

Figure 9D:
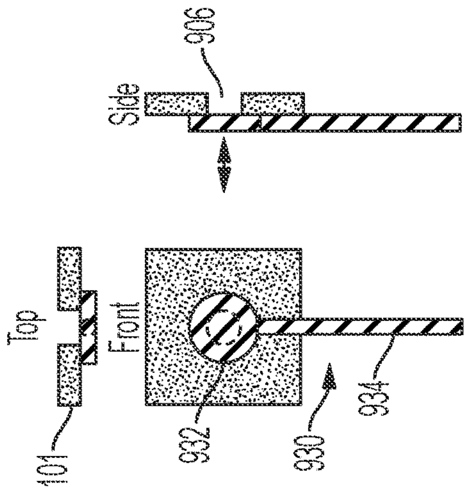

FIG. 9D provides top, front, and side views of an exemplary swing check valve 930. The swing check valve 930 includes a swing check valve plate or swing check valve head 932 and a valve stem 934 attached to the swing check valve plate or swing check valve head 932. When moving the valve stem 934, the swing check valve plate or swing check valve head 932 can be moved to cover the hole 906 in the outer body 101 or expose the hole 906. The motion of the swing check valve 930 is perpendicular to the hole 906. The swing check valve 930 is closed when the swing check valve plate or swing check valve head 932 covers the hole 906, while the swing check valve 930 is open when the hole 906 is not covered by the swing check valve plate or swing check valve head 932.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The functions and process steps herein may be performed automatically, wholly or partially in response to a user command. An activity (including a step) performed automatically is performed in response to one or more executable instructions or device operations without the user's direct initiation of the activity.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112 (f) unless the element is expressly recited using the phrase "means for."

I claim:

1. A tube retainer system, comprising:

an outer body;

a diaphragm having a circular opening;

a valve including a valve head and a valve stem attached to the valve head; a cam, wherein the valve stem is engaged with the cam;

a camshaft extending through the cam;

a drive gear attached to the camshaft, the drive gear comprising a plurality of drive gear teeth;

a restraint gear attached to the camshaft, the restraint gear comprising a plurality of restraint gear teeth;

a push bar located below the diaphragm, wherein one end of the push bar is connected to the outer body, and another end of the push bar is in contact with one of the plurality of drive gear teeth, pushing the drive gear to move in a first direction; and a pawl, wherein one end of the pawl is connected to the outer body, and another end of the pawl is in contact with one of the plurality of restraint gear teeth, preventing the restraint gear from moving in a second direction opposite to the first direction;

wherein the diaphragm, the cam, the drive gear, the restraint gear, the push bar, and the pawl are all provided in the outer body, and when a bottom of a tube is inserted into the circular opening and a downward pressure is applied on the diaphragm, the cam is oriented to close the valve to form a partial vacuum in the outer body to secure the bottom of the tube within the circular opening.

2. The tube retainer system as recited in claim 1, wherein the cam is an N-lobe cam, wherein N is equal to or larger than 1, and the N-lobe cam performs 1/N rotations to complete a tube pump cycle.

3. The tube retainer system as recited in claim 2, wherein the cam is a 2-lobe cam and includes two lobes.

4. The tube retainer system as recited in claim 3, wherein a difference between a maximum radius of the cam and a minimum radius of the cam is a distance within which the valve head is movable.

5. The tube retainer system as recited in claim 1, further comprising a valve cap attached to the outer body, wherein the valve cap is provided over the valve head of the valve to protect the valve head from splashed or spilled tube content.

6. The tube retainer system as recited in claim 5, a first hole or slot is provided in a left sidewall of the valve cap, and a second hole or slot is provided in a right sidewall of the valve cap.

7. The tube retainer system as recited in claim 1, wherein the valve is a captive valve further including a valve base, and the valve base is engaged with a groove inside the cam.

8. The tube retainer system as recited in claim 1, wherein the valve is a normally closed valve including a spring and an extension horizontally extending from the valve stem of the valve, wherein the extension is located below the spring, and the spring presses against the extension to keep the valve closed.

9. The tube retainer system as recited in claim 1, wherein the valve is a normally open valve including a bracket, a spring, and an extension horizontally extending from the valve stem of the valve, wherein the spring and the extension are located within the bracket, wherein the extension is located above the spring, and the spring presses against the extension to keep the valve open.

10. The tube retainer system as recited in claim 1, wherein the valve is a captive valve further including a valve base, and the valve base is engaged with a groove in an external surface of the cam.

11. The tube retainer system as recited in claim 1, wherein the valve is a captive valve, and one end of the valve stem is engaged with a surface of the cam through magnetism.

12. The tube retainer system as recited in claim 1, wherein the valve is a pinch valve including a flexible tube passing through a sidewall of the outer body, the pinch valve is closed when the valve stem of the valve applies sufficient pressure against the flexible tube to compress the flexible tube and prevent a passage of air through the flexible tube, and the pinch valve is open when the pressure on the valve stem is removed, so that the flexible tube resumes its original shape.

13. The tube retainer system as recited in claim 1, wherein the valve is a gate valve, the gate valve is closed when a hole in the outer body is covered by the valve head of the gate valve, and the gate valve is open when the hole is exposed, wherein a motion of the gate valve is parallel to the hole.

14. The tube retainer system as recited in claim 1, wherein the valve is a swing check valve, the swing check valve is closed when a hole in the outer body is covered by the valve head of the swing check valve, and the swing check valve is open when the hole is exposed, wherein a motion of the swing check valve is perpendicular to the hole.

15. The tube retainer system as recited in claim 1, wherein the first direction is a counterclockwise direction, and the second direction is a clockwise direction.

16. The tube retainer system as recited in claim 1, wherein the push bar includes a protrusion located below the circular opening, so that the bottom of the tube contacts the protrusion when the bottom of the tube is inserted into the circular opening.

17. A tube retainer system, comprising:

an outer body;

a diaphragm having a circular opening;

a valve including a valve head and a valve stem attached to the valve head;

a cam, wherein the valve stem is connected to the cam;

a camshaft extending through the cam;

a drive gear attached to the camshaft, the drive gear comprising a plurality of drive gear teeth;

a restraint gear attached to the camshaft, the restraint gear comprising a plurality of restraint gear teeth;

a push bar located below the diaphragm, wherein one end of the push bar is connected to the outer body, and another end of the push bar is in contact with one of the plurality of drive gear teeth, pushing the drive gear to move in a first direction; and a pawl, wherein one end of the pawl is connected to the outer body, and another end of the pawl is in contact with one of the plurality of restraint gear teeth, preventing the restraint gear from moving in a second direction opposite to the first direction;

wherein the diaphragm, the valve stem, the cam, the drive gear, the restraint gear, the push bar, and the pawl are all provided in the outer body, and the valve head is provided outside of the outer body;

when a bottom of a tube is inserted into the circular opening and a first downward pressure is applied on the diaphragm, the cam is oriented to close the valve to form a partial vacuum in the outer body to secure the bottom of the tube within the circular opening;

when the tube is picked up from the circular opening, a second downward pressure is applied on the diaphragm immediately prior to picking up the tube, and the cam is oriented to open the valve to restore atmospheric pressure in the outer body, so that the bottom of the tube is removable from the circular opening.

18. A tube retainer system, comprising:

an outer body;

a diaphragm having a circular opening;

a valve including a valve head and a valve stem attached to the valve head;

a cam, wherein the valve stem is connected to the cam;

a camshaft extending through the cam;

a drive gear attached to the camshaft, wherein the drive gear comprises a plurality of drive gear teeth;

a restraint gear attached to the camshaft, wherein the restraint gear comprises a plurality of restraint gear teeth;

a push bar located below the diaphragm, wherein one end of the push bar is connected to the outer body, and another end of the push bar is in contact with one of the plurality of drive gear teeth, pushing the drive gear to move in a first direction; and a pawl, wherein one end of the pawl is connected to the outer body, and another end of the pawl is in contact with one of the plurality of restraint gear teeth, preventing the restraint gear from moving in a second direction opposite to the first direction;

wherein the diaphragm, the valve stem, the cam, the drive gear, the restraint gear, the push bar, and the pawl are all provided in the outer body, and the valve head is provided outside of the outer body; a bottom of a tube is secured in the circular opening by means of a partial vacuum in the outer body;

a downward pressure is applied on the diaphragm immediately prior to picking up the tube, and the cam is oriented to open the valve to restore atmospheric pressure in the outer body, so that the bottom of the tube is removable from the circular opening.

* * * * *